(12) United States Patent
Bostick et al.

(10) Patent No.: US 9,596,654 B2
(45) Date of Patent: Mar. 14, 2017

(54) ASSOCIATION OF APPLICATIONS TO CLUSTERS MAPPED TO LOGICAL BATTERY PARTITIONS

(71) Applicant: International Business Machines Corporation, Armonk, NY (US)

(72) Inventors: James E. Bostick, Cedar Park, TX (US); John M. Ganci, Jr., Cary, NC (US); Martin G Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/738,292

(22) Filed: Jun. 12, 2015

(65) Prior Publication Data

US 2016/0366648 A1    Dec. 15, 2016

(51) Int. Cl.
*H04B 1/38*    (2015.01)
*H04B 1/16*    (2006.01)
*H04W 52/02*    (2009.01)

(52) U.S. Cl.
CPC ... *H04W 52/0261* (2013.01); *H04W 52/0258* (2013.01)

(58) Field of Classification Search
USPC ........................................................ 455/574
See application file for complete search history.

(56) References Cited

U.S. PATENT DOCUMENTS

| | | | |
|---|---|---|---|
| 7,386,739 B2 | 6/2008 | Ghiasi et al. | |
| 7,844,307 B2* | 11/2010 | Henson | H04M 1/677 370/311 |
| 8,004,234 B2* | 8/2011 | Walrath | G06F 1/26 320/107 |
| 8,230,245 B2 | 7/2012 | Khatri et al. | |
| 8,385,986 B2* | 2/2013 | Kim | H04M 1/72522 320/101 |
| 8,441,571 B2* | 5/2013 | Yamagishi | H04N 5/232 348/372 |
| 8,768,419 B2* | 7/2014 | Sivaraman | H04W 52/0261 320/136 |
| 8,799,870 B2 | 8/2014 | MacLellan et al. | |
| 8,805,764 B1 | 8/2014 | Rhines et al. | |
| 9,172,117 B2* | 10/2015 | Katpelly | G06F 1/3203 |
| 2007/0004467 A1* | 1/2007 | Chary | G06F 1/3203 455/572 |

(Continued)

OTHER PUBLICATIONS

Femal et al., "Boosting Data Center Performance Through Non-Uniform Power Allocation," Proceedings of the Second International Conference on Autonomic Computing (ICAC '05), 2005, IEEE Computer Society, 12 pages.

(Continued)

*Primary Examiner* — Tilahun B Gesesse
(74) *Attorney, Agent, or Firm* — Maeve Carpenter

(57) ABSTRACT

A tool for associating one or more apps to one or more app clusters mapped to one or more logical battery partitions on a mobile device. The tool retrieves the one or more apps on the mobile device. The tool determines an app power consumption and an app priority for the one or more apps. The tool defines the one or more app clusters to the one or more logical battery partitions. The tool associates the one or more apps to the one or more app clusters.

18 Claims, 4 Drawing Sheets

(56) References Cited

U.S. PATENT DOCUMENTS

| | | | |
|---|---|---|---|
| 2008/0186086 A1* | 8/2008 | Bell | H02J 7/0024 |
| | | | 327/544 |
| 2013/0024794 A1 | 1/2013 | Ha et al. | |
| 2014/0201681 A1 | 7/2014 | Mahaffey et al. | |
| 2015/0019889 A1 | 1/2015 | Banerjee et al. | |

OTHER PUBLICATIONS

Li et al., "Computation Offloading to Save Energy on Handheld Devices: A Partition Scheme," Proceedings of the 2001 International Conference on Compilers, Architecture, and Synthesis for Embedded Systems (CASES '01), Nov. 16-17, 2001, ACM, 9 pages.

Rahman et al., "Energy Saving in Mobile Cloud Computing," 2013 IEEE International Conference on Cloud Engineering (IC2E), © 2013 IEEE, pp. 285-291.

Saini et al., "Refined Cluster Based Mobility Prediction with Weighted Algorithm," 2010 International Conference on Computational Intelligence and Communication Networks (CICN), © 2010 IEEE, pp. 350-354.

* cited by examiner

ASSOCIATION OF APPLICATIONS TO CLUSTERS MAPPED TO LOGICAL BATTERY PARTITIONS

BACKGROUND OF THE INVENTION

The present invention relates generally to power management for a mobile device, and more particularly to associating applications to clusters mapped to logical battery partitions.

There may be many different types of mobile applications (apps) for various purposes. On a particular mobile device of a user, for example, some apps may be used frequently, whereas other apps may be used infrequently. A power consumption rate of an app on a mobile device may vary greatly from one app to the next. For example, a mobile device of a user may have important business function with apps A, B, and C, and also allows a child to use the mobile device to play games with app D. The power consumption rates of apps A, B, and C may vary greatly from the power consumption rate of app D.

SUMMARY

Aspects of an embodiment of the present invention disclose a method, a computer system, and a computer program product for optimizing battery life of a mobile device, in accordance with an embodiment of the present invention. The method includes retrieving, by one or more computer processors, the one or more apps on the mobile device. The method includes determining, by one or more computer processors, an app power consumption and an app priority for the one or more apps. The method includes defining, by one or more computer processors, the one or more app clusters to the one or more logical battery partitions. The method includes associating, by one or more computer processors, the one or more apps to the one or more app clusters.

DETAILED DESCRIPTION

Embodiments of the present invention provide the capability to automatically associate apps to app clusters that are mapped to logical battery partitions on a mobile device. Embodiments of the present invention provide the capability to define an app priority and an app power consumption rate. Embodiments of the present invention provide the capability to evaluate the app priority and app power consumption rate to determine an app cluster association. Embodiments of the present invention provide the capability to automatically rebalance power allocation from the logical battery partitions based on a usage pattern. Embodiments of the present invention provide the capability to visualize the app clusters, where the visualization of the app clusters further includes a visualization of power allocated to the app clusters in terms of time and percentage.

Implementation of such embodiments may take a variety of forms, and exemplary implementation details are discussed subsequently with reference to the Figures.

Figure 1:
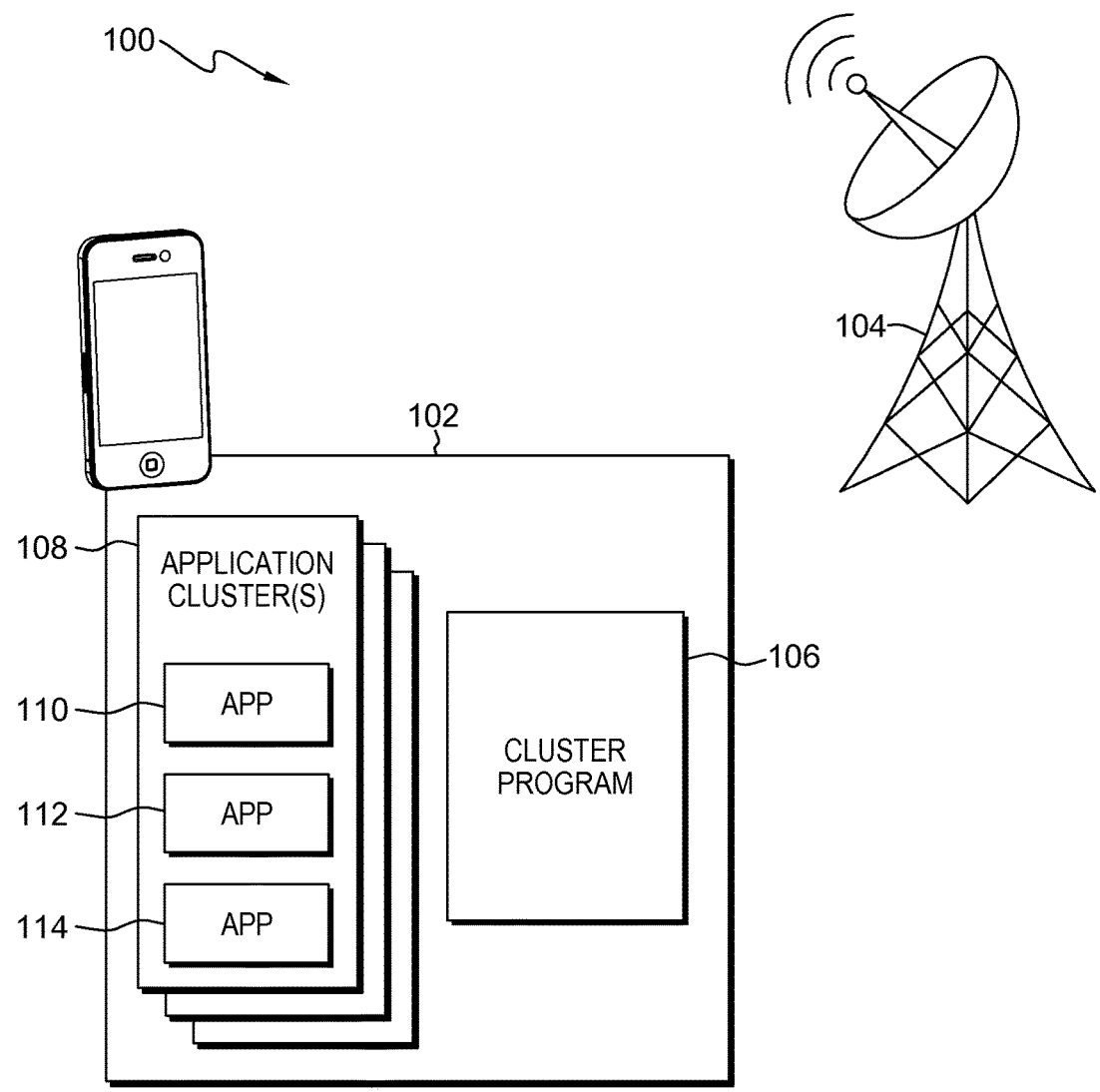
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes mobile device 102 and network 104.

In the exemplary embodiment, mobile device 102 may be any suitable type of mobile device capable of running mobile applications, including a smart phone, tablet, slate, or any type of device that runs a mobile operating system. In one embodiment, mobile device 102 is a mobile device capable of logical battery partitioning, such that one or more app clusters, such as app cluster(s) 108 may be mapped to each of one or more logical battery partitions within mobile device 102. In one embodiment, mobile device 102 includes one or more operating system (OS) application program interfaces (API) that provide the capability to gather information on available power for each of one or more logical battery partitions. Mobile device 102 includes a cluster program 106 and one or more app clusters, such as app cluster(s) 108, where the one or more app clusters include one or more mobile applications (apps), such as app 110, app 112, and app 114.

As used herein, "application," "mobile application," or "app" encompasses application software that runs on (or is capable of running on) mobile devices and performs specific tasks for the mobile device's user. In general, applications encompass any software file comprising instructions that can be understood and processed on a computing device, such as, for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the mobile device by a vendor) such as address books, calendars, calculators, games, maps, and web browsers. Applications may also be downloaded from a plurality of application software distribution platforms via a network, such as network 104, for execution on a mobile device, such as mobile device 102.

Mobile device 102 is capable of communicating with one or more mobile devices, networks, and electronic devices or computing systems capable of sending and receiving data through network 104. In one embodiment, network 104 is the Internet representing a worldwide collection of networks and gateways that use TCP/IP protocols to communicate with one another. Network 104 may include wire cables, wireless communication links, fiber optic cables, routers, switches, and/or firewalls. Network 104 can be any combination of connections and protocols capable of supporting communications between mobile device 102 and one or more mobile devices, networks, and electronic devices or computing systems capable of sending and receiving data through network 104. Network 104 may also be implemented as a number of different types of networks, such as an intranet, a local area network (LAN), a virtual local area network (VLAN), or a wide area network (WAN). Network 104 may include wire cables, wireless communication links, fiber optic cables, routers, switches, and/or firewalls.

In one embodiment, cluster program 106 is a software-based component capable of associating one or more apps to one or more app clusters mapped to logical battery partitions based, at least in part, on an app power consumption on a particular device type, and an app priority (i.e., a usage priority) for a type of app. In one embodiment, cluster program 106 provides the capability to automatically associate (i.e., add) one or more applications, such as app 110, app 112, and app 114, to an appropriate application cluster, such as app cluster(s) 108, based on an app power consumption for each of the one or more applications, where the app power consumption represents a defined or learned set of attributes for how power (i.e., battery power of a mobile device, such as mobile device 102) is consumed by a particular application based on app usage on a specific device. In one embodiment, cluster program 106 provides the capability to define an app power consumption and a usage priority for one or more applications on a mobile device, such as app 110, app 112, and app 114 of mobile device 102. In one embodiment, cluster program 106 provides the capability to monitor a usage pattern and an app power consumption for one or more applications on a mobile device, such as app 110, app 112, and app 114 on mobile device 102. In one embodiment, cluster program 106 provides the capability to predict and recommend a rebalance of power between one or more application clusters, such as app cluster(s) 108, when a usage pattern deviates from a pre-determined or learned normal usage pattern. In one embodiment, cluster program 106 provides an overlay of power available for each of one or more application clusters, such as app cluster(s) 108, where the overlay includes a visualization of a time and a percentage of battery life remaining in the logical battery partition. In one embodiment, cluster program 106 provides the capability to split one or more application clusters, such as app cluster(s) 108, mapped to one or more logical battery partitions, merge the one or more application clusters, such as app cluster(s) 108, mapped to the one or more logical battery partitions, and create a hierarchy for the one or more application clusters, such as app cluster(s) 108, mapped to the one or more logical battery partitions, where the hierarchy can be based, at least in part, on one or more of an app power consumption, an app priority, and a pattern of usage and power consumption.

In the exemplary embodiment, app cluster(s) 108 is a logical cluster of one or more applications, such as app 110, app 112, and app 114, mapped to one or more logical battery partitions on a mobile device, such as mobile device 102. In one embodiment, app cluster(s) 108 includes a power meter, where the power meter is an overlay that includes a visualization of a time and a percentage of battery life remaining in the logical battery partition associated with a particular app cluster(s) 108. In one embodiment, app cluster(s) 108 may be represented by a visualization displayed on a graphical user interface of a mobile device, such as mobile device 102.

Figure 2:
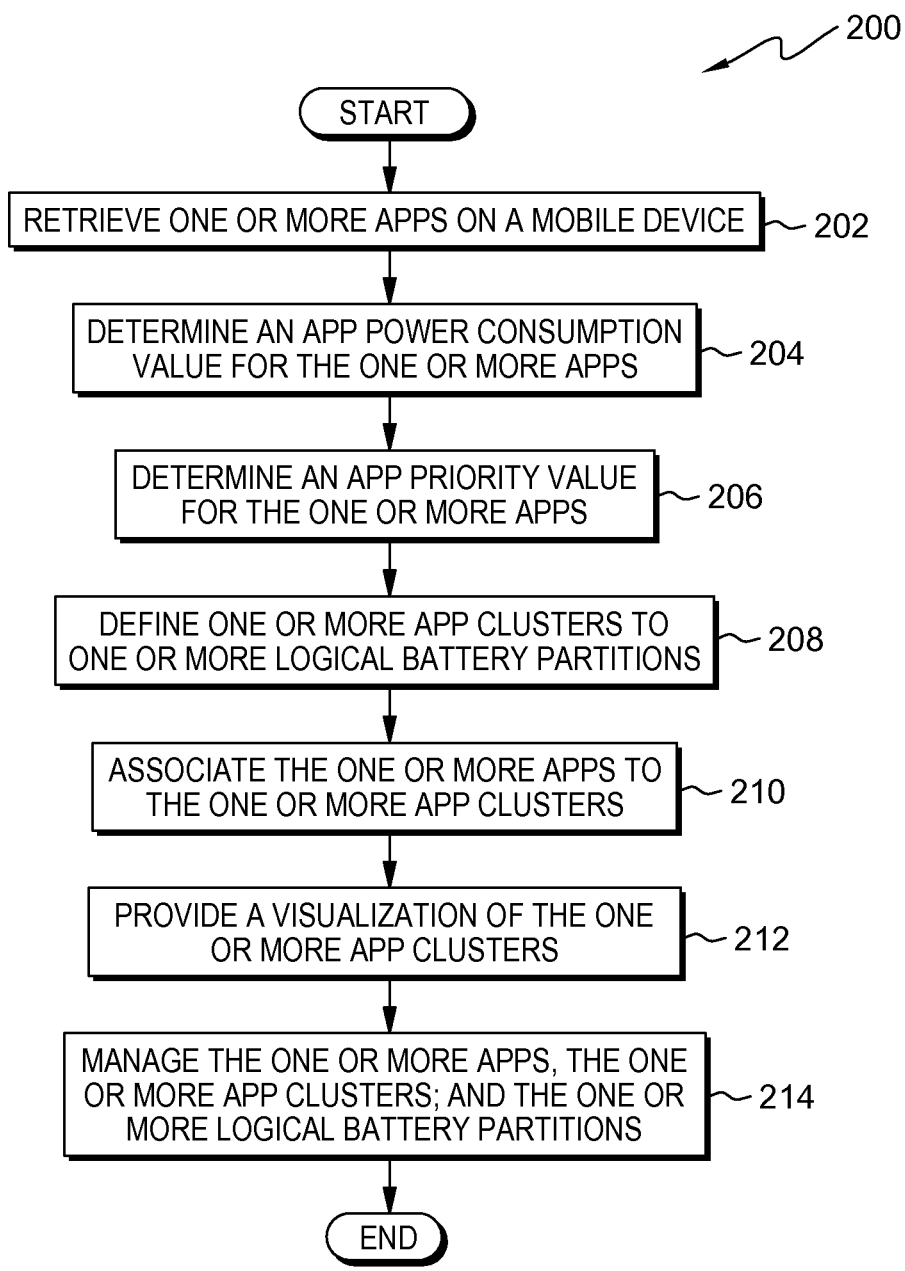
FIG. 2 is a flowchart depicting operational steps of a cluster program (such as the cluster program of FIG. 1) for association of applications to application clusters mapped to logical battery partitions, in accordance with an embodiment of the present invention.

FIG. 2 is a flowchart depicting operational steps of a cluster program, such as cluster program 106 of FIG. 1, generally designated 200, for association of applications to clusters mapped to logical battery partitions, in accordance with an embodiment of the present invention.

Cluster program 106 retrieves one or more apps on a mobile device (202). In the exemplary embodiment, cluster program 106 retrieves one or more apps for association within an application cluster mapped to a logical battery partition on a mobile device. In the exemplary embodiment, cluster program 106 retrieves one or apps, such as app 110, app 112, and app 114 by searching a mobile device, such as mobile device 102, for the one or more apps, wherein the one or more apps include a set of attributes for how power is consumed. In the exemplary embodiment, cluster program 106 gathers information from the set of attributes including, but not limited to, how each of the one or more apps consumes power based, at least in part, on a usage pattern and a specific device type. In one embodiment, cluster program 106 periodically searches a mobile device, such as mobile device 102, for additional applications installed on the mobile device, such that the additional applications can be automatically associated within an application cluster, such as app cluster(s) 108.

Cluster program 106 determines an app power consumption value for the one or more apps (204). In one embodiment, cluster program 106 determines an app power consumption value for the one or more apps, such as app 110, app 112, and app 114, by retrieving a power consumption rate for given functions of an app and a mobile device type defined by an app developer, a manufacturer, etc., and further defining the power consumption rate as the app power consumption value for the one or more apps. In one embodiment, the app power consumption value may be a numerical value on a weighted scale, for example 1-10, where 1 indicates a low power consumption rate and 10 indicates a high power consumption rate. Alternatively, the app power consumption value may be designated categorically, for example as high consumption, medium consumption, or low consumption. In another embodiment, cluster program 106 retrieves a pre-defined power consumption rate from the set of attributes from the one or more applications, wherein the pre-defined power consumption rate is a user defined power consumption rate based, at least in part, on actual power consumption for a given app on a particular mobile device, such as mobile device 102, and further defines the pre-defined power consumption rate as the app power consumption value for the one or more apps. In another embodiment, cluster program 106 learns a power consumption rate by monitoring a usage pattern of one or more apps, such as app 110, app 112, and app 114, and further defines the app power consumption value for the one or more apps based, at least in part, on the learned power consumption rate for the one or more apps. For example, cluster program 106 may monitor a usage pattern for a particular app, such as app 110, and where the usage pattern indicates frequent use by a user with a high power consumption rate, cluster program 106 may determine an app power consumption value for the particular app accordingly, such as defining the app power consumption value as "10".

Cluster program 106 determines an app priority value for the one or more apps (206). In one embodiment, cluster program 106 determines an app priority value for the one or more apps, such as app 110, app 112, and app 114, by retrieving a user defined app priority value for one or more apps, wherein the user defined app priority indicates a user specified importance associated with each of the one or more apps. In one embodiment, the app priority value may be a numerical value on a weighted scale, for example 1-10, where 1 indicates a low priority (i.e., low importance) and 10 indicates a high priority (i.e., high importance). Alternatively, the app priority value may be designated categorically, for example as high priority, medium priority, or low priority. For example, a first app on a mobile device, such as app 110 on mobile device 102, may be more important to a user than a second app, such as app 112, on the mobile device, and as such, the user may indicate a higher importance associated with the first app by defining an app priority value for the first app as "10". In another embodiment, cluster program 106 learns an app priority for one or more apps on a mobile device, such as app 110, app 112, and app 114 of mobile device 102, by monitoring a usage pattern (i.e., a user specific usage pattern) of the one or more apps, and further defines an app priority value for the one or more apps based, at least in part, on the learned app priority as indicated by the usage pattern. For example, cluster program 106 may monitor a usage pattern for a particular app, such as app 110, and where the usage pattern indicates frequent and continuous use by a user, cluster program 106 may determine an app priority value for the particular app accordingly, such as defining the app priority value for the particular app as "10".

Cluster program 106 defines one or more app clusters to one or more logical battery partitions (208). In one embodiment, cluster program 106 defines one or more app clusters, such as app cluster(s) 108, to one or more logical battery partitions on a mobile device, such as mobile device 102, by retrieving one or more pre-defined app clusters mapped to one or more logical battery partitions, where the one or more pre-defined app clusters are user defined. In one embodiment, mapping one or more pre-defined app clusters to one or more logical battery partitions may be statically defined by a user. For example, one or more app clusters may be assigned to one or more logical battery partitions based on a known priority pre-defined by a user. In yet another example, one or more app clusters may be assigned to one or more logical battery partitions based on a usage pattern (i.e., a learned usage pattern, a pre-determined usage pattern, etc.). In yet another example, cluster program 106 may assign one or more app clusters equal power allocation across one or more logical battery partitions, then monitor a usage pattern for each of the one or more app clusters and reconfigure logical battery partition assignments accordingly. In another embodiment, cluster program 106 may manage mapping of the one or more app clusters to the one or more logical battery partitions, where managing includes automatically creating and adjusting mapping based, at least in part, on a learned usage pattern. For example, cluster program 106 may monitor a usage pattern associated with an app cluster, such as app cluster(s) 108, and where cluster program 106 learns that the app cluster consumes power from a logical battery partition in excess of an allocated amount of power (e.g., twenty percent of the logical battery partition), cluster program 106 may reconfigure the logical battery partition to allow for additional power allocation for the app cluster (e.g., fifty percent of the logical battery partition). In another example, cluster program 106 may monitor a usage pattern associated with an app cluster, such as app cluster(s) 108, and where cluster program 106 learns that the app cluster consumes power from a logical battery partition in excess of an allocated amount of power (e.g., twenty percent of the logical battery partition), cluster program 106 may create an additional logical battery partition and map the app cluster to the additional app cluster, allocating an increased amount of power provided by the logical battery partition to the app cluster. In one embodiment, cluster program 106 may determine a power allocation value for the one or more app clusters, where the power allocation value may be an amount of power (i.e., a percentage of battery power provided by a logical battery partition) allocated to a particular app cluster based, at least in part, on a particular logical battery partition. In another embodiment, cluster program 106 may determine a priority value for the one or more app clusters, where the priority value may be a numerical value (e.g., 1-10) or a categorical/organizational value (e.g., work, play, productivity, social networking, music, games, etc.) representative of a user preference.

Cluster program 106 associates the one or more apps to the one or more app clusters (210). In one embodiment, cluster program 106 associates the one or more apps, such as app 110, app 112, and app 114, to the one or more app clusters, such as app cluster(s) 108, by determining one or more app clusters to associate the one or more apps based, at least in part, on an app power consumption value and an app priority value for each of the one or more apps. In one embodiment, cluster program 106 determines the one or more app clusters to associate the one or more apps by evaluating an app power consumption value and an app priority value for each of the one or more apps, and based on the app power consumption value and the app priority value for each of the one or more apps, clustering the one or more apps together in an app cluster relative to similarities in the app power consumption values and the app priority values. For example, cluster program 106 may evaluate an app power consumption value and an app priority value for a plurality of apps, and based on the evaluation, cluster each of the plurality of apps having an app power consumption value of "10" and an app priority value of "10" together in an app cluster, such as app cluster(s) 108. In another embodiment, cluster program 106 may cluster the one or more apps together based on differences in a usage pattern and an app priority. For example, cluster program 106 may cluster a first app that is used infrequently with a second app that is used frequently, such that power allocated to a particular logical battery partition is optimized. In another embodiment, cluster program 106 may cluster the one or more apps together relative to a type of app (e.g., productivity, social networking, game, etc.), such that, for example, all productivity (i.e., work related) apps are clustered together and associated to an app cluster designated for productivity. In one embodiment, where one or more additional apps are installed on a mobile device, such as mobile device 102, cluster program 106 may evaluate an app power consumption value and an app priority value for each of the one or more additional apps to determine one or more app clusters, such as app cluster(s) 108, to associate the one or more additional apps. In another embodiment, cluster program 106 provides the capability for a user to manually associate one or more apps, such as app 110, app 112, and app 114, to one or more app clusters, such as app cluster(s) 108, mapped to one or more logical battery partitions. In yet another embodiment, cluster program 106 provides the capability for a user to initiate a rebalancing of one or more apps, such as app 110, app 112, and app 114, across one or more app clusters, such as app cluster(s) 108, based, at least in part, on changes in app power consumption or app priority, where the changes may be observed by a user through usage or by cluster program 106 recognizing deviations from a learned usage pattern.

Cluster program 106 provides a visualization of the one or more app clusters (212). In one embodiment, cluster program 106 provides a visualization of the one or more app clusters, such as app cluster(s) 108, by displaying the one or more app clusters within a user interface, where the user interface refers to information (such as graphic, text, and sound) a program presents to a user and the control sequences the user employs to control the program and the information. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements, for example, through swipe gestures and touch commands.

In one embodiment, cluster program 106 displays a visualization of each of the one or more app clusters, where the visualization includes a depiction of available power with the associated logical battery partition (e.g., a percentage of battery life) and based, at least in part, on the available power, a depiction of available time remaining to use any of the one or more apps associated with the one or more app clusters. In another embodiment, the visualization may include either a depiction of available power or a depiction of available time remaining to use any of the one or more apps. In one embodiment, cluster program 106 may display one or more notifications within the visualization of each of the one or more app clusters, where the one or more notifications may include an alert that a recent usage pattern is inconsistent with a previous (i.e., normal) usage pattern, a recommendation to rebalance an allocation of logical battery partitions, a recommendation to split one or more app clusters and associated logical battery partitions, a recommendation to merge one or more app clusters and associated logical battery partitions, and a recommendation to recharge the mobile device more frequently. In one embodiment, cluster program 106 may receive one or more user selections of one or more apps from a first app cluster in a visualization and associate the selected one or more apps to a second app cluster in the visualization. For example, in response to cluster program 106 receiving a user selection of an app from a first app cluster (i.e., a user selects the app via a user interface, such as highlights, clicks, gestures, etc.) and drops the selected app into a second app cluster, cluster program 106 associates the selected app with the second app cluster. In another embodiment, responsive to receiving one or more user selections of one or more apps in one or more app clusters, cluster program 106 displays available power in the logical battery partition relative to the selected one or more apps.

Cluster program 106 manages the one or more apps, the one or more app clusters, and the one or more logical battery partitions (214). In one embodiment, cluster program 106 manages the one or more apps, such as app 110, app 112, and app 114, the one or more app clusters, such as app cluster(s) 108, and the one or more logical battery partitions associated with the one or more app clusters by monitoring a usage pattern associated with the one or more apps, and rebalancing the one or more app clusters across the one or more logical battery partitions based on changes in the usage pattern relative to app power consumption and app priority.

In one embodiment, cluster program 106 may reallocate power from a first app cluster to a second app cluster, where the second app cluster demands a greater power consumption rate based on the one or more apps within the second app cluster. In one embodiment, cluster program 106 may merge one or more app clusters where a usage pattern indicates a surplus of power provided by the one or more logical battery partitions, such that the merged one or more app clusters may be mapped to a logical battery partition optimized for a power consumption rate of the merged one or more app clusters. In one embodiment, cluster program 106 may split a first app cluster into one or more additional app clusters and reallocate power from one or more logical battery partitions accordingly. In one embodiment, cluster program 106 provides the capability for a user to create a ranked hierarchy of a plurality of app clusters, such that power can be allocated accordingly across the ranked hierarchy of the plurality of app clusters, where a higher ranked app cluster receives a greater percentage of allocated power than a lower ranked app cluster. In one embodiment, cluster program 106 recommends a rebalance of power allocation of one or more logical battery partitions when a recent usage pattern is inconsistent with a previous (i.e., normal) usage pattern, and further rebalances power allocation to reconcile inconsistent usage patterns to optimize the one or more logical battery partitions.

Figure 3:
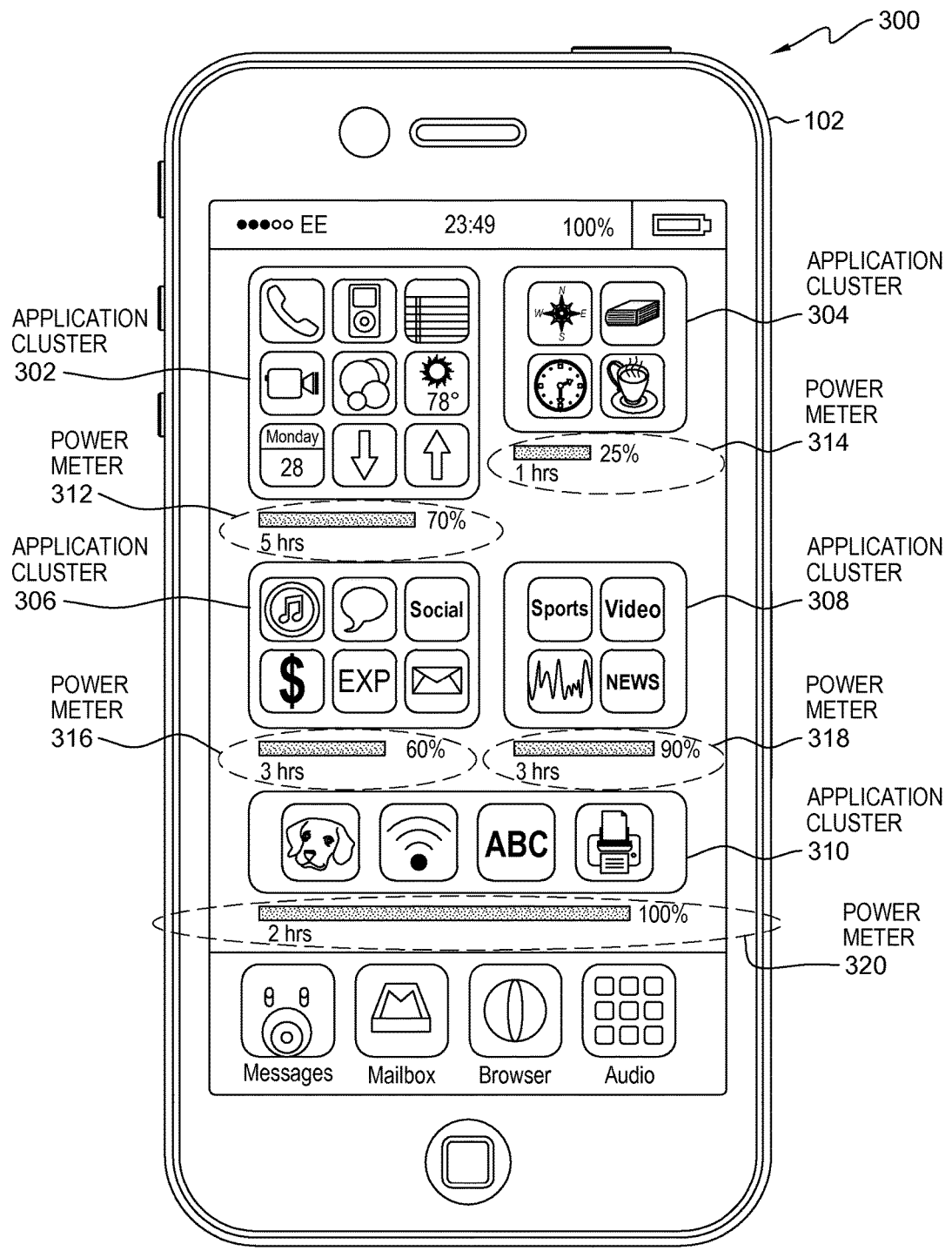
FIG. 3 is a screenshot of a mobile device (such as the mobile device of FIG. 1) depicting a plurality of application clusters (such as the app cluster(s) of FIG. 1), in accordance with an embodiment of the present invention.

FIG. 3 is a screenshot of a mobile device, such as mobile device 102 of FIG. 1, generally designated 300, depicting a plurality application clusters, such as app cluster(s) 108 of FIG. 1, in accordance with an embodiment of the present invention.

In the illustrative embodiment, mobile device 102 includes one or more visualizations of one or more app clusters, such as application cluster 302, 304, 306, 308, and 310. The one or more app clusters are mapped to one or more logical battery partitions (not shown), where the one or more app clusters include one or more apps, such as app 110, app 112, and app 114 of FIG. 1. In the illustrative embodiment, each of the one or more app clusters, such as application cluster 302, 304, 306, 308, and 310 include a power meter, such as power meter 312, 314, 316, 318, and 320, respectively, where the power meter displays a percentage of available power remaining in the logical battery partition, and an available amount of use time remaining based on the percentage of available power remaining in the logical battery partition.

Figure 4:
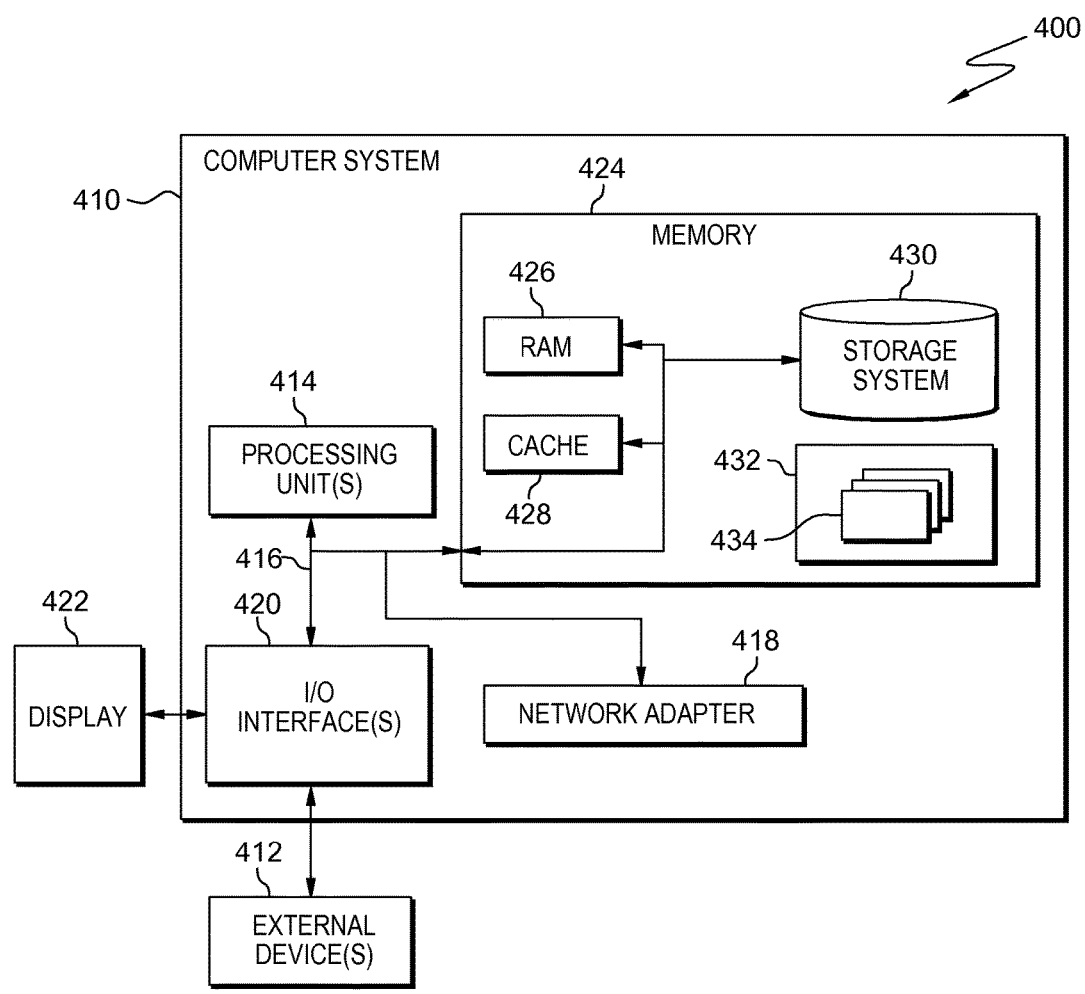
FIG. 4 is a block diagram depicting components of a data processing system (such as the mobile device of FIG. 1), in accordance with an embodiment of the present invention.

FIG. 4 depicts a block diagram of components of data processing environment 100, such as mobile device 102 of FIG. 1, generally designated 400, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, mobile device 102 in data processing environment 100 is shown in the form of a general-purpose computing device, such as computer system 410. The components of computer system 410 may include, but are not limited to, one or more processors or processing unit 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method comprising:
retrieving, by one or more computer processors, one or more applications (apps) on a mobile device;
determining, by one or more computer processors, an app power consumption and an app priority for the one or more apps, wherein determining includes retrieving a pre-defined power consumption rate from a set of attributes from each of the one or more apps, wherein the pre-defined power consumption rate is based on actual power consumption for each of the one or more apps on the mobile device, and further defining the pre-defined power consumption rate as the app power consumption for each of the one or more apps;
defining, by one or more computer processors, one or more app clusters to one or more logical battery partitions on the mobile device; and
associating, by one or more computer processors, the one or more apps to the one or more app clusters, wherein associating includes determining the one or more app clusters to associate each of the one or more apps, wherein determining includes evaluating the app power consumption and the app priority for each of the one or more apps, and, based on the app power consumption and the app priority for each of the one or more apps, clustering each of the one or more apps together in the one or more app clusters relative to similarities in the app power consumption and the app priority.

2. The method of claim 1, further comprises managing, by one or more computer processors, the one or more apps, the one or more app clusters, and the one or more logical battery partitions.

3. The method of claim 2 wherein managing the one or more apps, the one or more app clusters, and the one or more logical battery partitions, further comprises:
monitoring, by one or more computer processors, a usage pattern associated with the one or more apps and the one or more app clusters; and
responsive to a change in the usage pattern, rebalancing, by one or more computer processors, the one or more app clusters across the one or more logical battery partitions based on the app power consumption and the app priority for each of the one or more apps.

4. The method of claim 1, wherein retrieving the one or more apps on the mobile device, further comprises:
searching, by one or more computer processors, the mobile device for the one or more apps, wherein the one or more apps include a set of attributes for how power is consumed; and
gathering, by one or more computer processors, information from the set of attributes including how each of the one or more apps consumes power based on a usage pattern and a specific mobile device type.

5. The method of claim 1, wherein determining an app power consumption for the one or more apps, further comprises at least one of:

retrieving, by one or more computer processors, a power consumption rate for one or more functions of each of the one or more apps and a mobile device type, and further defining the power consumption rate as the app power consumption for each of the one or more apps; and learning, by one or more computer processors, a power consumption rate for each of the one or more apps, and further defining the app power consumption for each of the one or more apps based, at least in part, on the learned power consumption rate for each of the one or more apps.

6. The method of claim 1, wherein determining an app priority for the one or more apps, further comprises at least one of:

retrieving, by one or more computer processors, a user defined app priority for each of the one or more apps, wherein the user defined app priority indicates a user specified importance associated with each of the one or more apps; and learning, by one or more computer processors, an app priority for each of the one or more apps, wherein learning includes monitoring a usage pattern relative to each of the one or more apps, and further defining an app priority for each of the one or more apps based on the learned app priority as indicated by the usage pattern.

7. The method of claim 1, wherein defining the one or more app clusters to the one or more logical battery partitions, further comprises at least one of:

retrieving, by one or more computer processors, one or more pre-defined app clusters mapped to the one or more logical battery partitions, wherein the one or more pre-defined app clusters are statically defined;

managing, by one or more computer processors, mapping of the one or more app clusters to the one or more logical battery partitions, wherein managing includes creating and adjusting mapping of the one or more app clusters based on a usage pattern; and determining, by one or more computer processors, a power allocation value for each of the one or more app clusters, wherein the power allocation value indicates a particular logical battery partition to map each of the one or more app clusters based on an amount of power allocated to the particular logical battery partition.

8. The method of claim 1 further comprises:

displaying, by one or more computer processors, a visualization of the one or more app clusters, wherein displaying the visualization includes displaying one or more notifications within the visualization of each of the one or more app clusters, wherein the one or more notifications include one or more of:

a usage pattern alert;

an available power in the logical battery partition available for each of the one or more apps;

a power meter, wherein the power meter displays a percentage of available power remaining in the logical battery partition and an available amount of use time remaining based, at least in part, on the percentage of available power remaining in the logical battery partition;

a recommendation to rebalance an allocation of logical battery partitions;

a recommendation to split one or more app clusters and associated logical battery partitions;

a recommendation to merge one or more app clusters and associated logical battery partitions; and a recommendation to recharge the mobile device more frequently.

9. The method of claim 8, further comprises:

receiving, by one or more computer processors, one or more user selections of one or more apps from a first app cluster in a visualization; and responsive to the one or more user selections of the one or more apps from the first app cluster, associating, by one or more computer processors, the selected one or more apps to a second app cluster in the visualization.

10. A computer program product comprising:

one or more computer readable storage devices and program instructions stored on the one or more computer readable storage devices, the program instructions comprising:

program instructions to retrieve one or more applications (apps) on a mobile device;

program instructions to determine an app power consumption and an app priority for the one or more apps, wherein determining includes retrieving a pre-defined power consumption rate from a set of attributes from each of the one or more apps, wherein the pre-defined power consumption rate is based on actual power consumption for each of the one or more apps on the mobile device, and further defining the pre-defined power consumption rate as the app power consumption for each of the one or more apps;

program instructions to define one or more app clusters to one or more logical battery partitions on the mobile device; and program instructions to associate the one or more apps to the one or more app clusters wherein associating includes determining the one or more app clusters to associate each of the one or more apps, wherein determining includes evaluating the app power consumption and the app priority for each of the one or more apps, and, based on the app power consumption and the app priority for each of the one or more apps, clustering each of the one or more apps together in the one or more app clusters relative to similarities in the app power consumption and the app priority.

11. The computer program product of claim 10, further comprises:

program instructions to manage the one or more apps, the one or more app clusters, and the one or more logical battery partitions.

12. The computer program product of claim 11, wherein program instructions to manage the one or more apps, the one or more app clusters, and the one or more logical battery partitions, further comprises:

program instructions to monitor a usage pattern associated with the one or more apps and the one or more app clusters; and responsive to a change in the usage pattern, program instructions to rebalance the one or more app clusters across the one or more logical battery partitions based on the app power consumption and the app priority for each of the one or more apps.

13. The computer program product of claim 10, wherein program instructions to retrieve the one or more apps on the mobile device, further comprises:

program instructions to search the mobile device for the one or more apps, wherein the one or more apps include a set of attributes for how power is consumed; and program instructions to gather information from the set of attributes including, but not limited to, how each of the one or more apps consumes power based on a usage pattern and a specific mobile device type.

14. The computer program product of claim 10, wherein program instructions to determine an app power consumption for the one or more apps, further comprises at least one of:
   program instructions to retrieve a power consumption rate for one or more functions of each of the one or more apps and a mobile device type, and further defining the power consumption rate as the app power consumption for each of the one or more apps; and
   program instructions to learn a power consumption rate for each of the one or more apps, and further defining the app power consumption for each of the one or more apps based, at least in part, on the learned power consumption rate for each of the one or more apps.

15. A computer system for association of one or more apps to one or more app clusters mapped to one or more logical battery partitions of a mobile device, the computer system comprising:
   one or more computer processors;
   one or more computer readable storage devices;
   program instructions stored on at least one of the one or more computer readable storage devices for execution by at least one of the one or more computer processors, the program instructions comprising:
   program instructions to retrieve one or more applications (apps) on a mobile device;
   program instructions to determine an app power consumption and an app priority for the one or more apps, wherein determining includes retrieving a pre-defined power consumption rate from a set of attributes from each of the one or more apps, wherein the pre-defined power consumption rate is based on actual power consumption for each of the one or more apps on the mobile device, and further defining the pre-defined power consumption rate as the app power consumption for each of the one or more apps;
   program instructions to define one or more app clusters to one or more logical battery partitions on the mobile device; and
   program instructions to associate the one or more apps to the one or more app clusters, wherein associating includes determining the one or more app clusters to associate each of the one or more apps, wherein determining includes evaluating the app power consumption and the app priority for each of the one or more apps, and, based on the app power consumption and the app priority for each of the one or more apps, clustering each of the one or more apps together in the one or more app clusters relative to similarities in the app power consumption and the app priority.

16. The computer system of claim 15, wherein program instructions to determine an app priority for the one or more apps, further comprises at least one of:
   program instructions to retrieve a user defined app priority for each of the one or more apps, wherein the user defined app priority indicates a user specified importance associated with each of the one or more apps; and
   program instructions to learn an app priority for each of the one or more apps, wherein learning includes monitoring a usage pattern relative to each of the one or more apps, and further defining an app priority for each of the one or more apps based, at least in part, on the learned app priority as indicated by the usage pattern.

17. The computer system of claim 15, wherein program instructions to define the one or more app clusters to the one or more logical battery partitions, further comprises at least one of:
   program instructions to retrieve one or more pre-defined app clusters mapped to the one or more logical battery partitions, wherein the one or more pre-defined app clusters are statically defined;
   program instructions to manage mapping of the one or more app clusters to the one or more logical battery partitions, wherein managing includes creating and adjusting mapping of the one or more app clusters based on a usage pattern; and
   program instructions to determine a power allocation value for each of the one or more app clusters, wherein the power allocation value indicates a particular logical battery partition to map each of the one or more app clusters based on an amount of power allocated to the particular logical battery partition.

18. The computer system of claim 15 further comprises:
   program instructions to display a visualization of the one or more app clusters, wherein displaying the visualization includes displaying one or more notifications within the visualization of each of the one or more app clusters, wherein the one or more notifications include one or more of:
   a usage pattern alert;
   an available power in the logical battery partition available for each of the one or more apps;
   a power meter, wherein the power meter displays a percentage of available power remaining in the logical battery partition and an available amount of use time remaining based, at least in part, on the percentage of available power remaining in the logical battery partition;
   a recommendation to rebalance an allocation of logical battery partitions;
   a recommendation to split one or more app clusters and associated logical battery partitions;
   a recommendation to merge one or more app clusters and associated logical battery partitions; and
   a recommendation to recharge the mobile device more frequently.

* * * * *